United States Patent [19]

Chamberlain

[11] 4,186,626
[45] Feb. 5, 1980

[54] WHEEL FINAL DRIVE ASSEMBLY

[75] Inventor: Richard W. Chamberlain, Aurora, Ill.

[73] Assignee: Caterpillar Tractor Co., Peoria, Ill.

[21] Appl. No.: 879,304

[22] Filed: Feb. 21, 1978

[51] Int. Cl.² ............... F16H 1/28; F16H 35/00; F16H 57/00; B60K 23/00

[52] U.S. Cl. ............... 74/801; 74/391; 74/405; 180/70 R

[58] Field of Search ............ 74/801, 391, 405; 180/43 B, 65 F, 66 F, 70 R; 301/1, 6 R

[56] References Cited

U.S. PATENT DOCUMENTS

| | | | |
|---|---|---|---|
| 2,543,811 | 3/1951 | Snow et al. | 74/801 |
| 2,709,327 | 5/1955 | Heth | 74/391 X |
| 3,504,564 | 4/1970 | Kell | 74/391 X |
| 3,737,000 | 6/1973 | Knobloch et al. | 180/43 B |
| 4,043,226 | 8/1977 | Buuck | 74/801 |
| 4,091,688 | 5/1978 | Huffman | 74/801 X |
| 4,132,134 | 1/1979 | Avery et al. | 74/391 X |

*Primary Examiner*—Lance Chandler
*Attorney, Agent, or Firm*—Sixbey, Bradford & Leedom

[57] ABSTRACT

A wheel final drive assembly for vehicles, wherein the assembly includes a two stage or double reduction planetary gearing mechanism positioned within wheel hubs and connected to the vehicle drive wheels, a drive axle shaft for interconnecting a vehicle power train differential and the gearing mechanism, a separable part hollow hub having positioning faces contacting and axially positioning gears of the mechanism, a hollow spacer plug insertable through the hollow hub and having a face contactable with the outer end of the axle shaft to operatively position the axle shaft, removal of the plug permitting movement of the axle shaft through the hollow hub to an inoperative position in the assembly, and partial stowing therewithin or complete removal therefrom.

24 Claims, 7 Drawing Figures

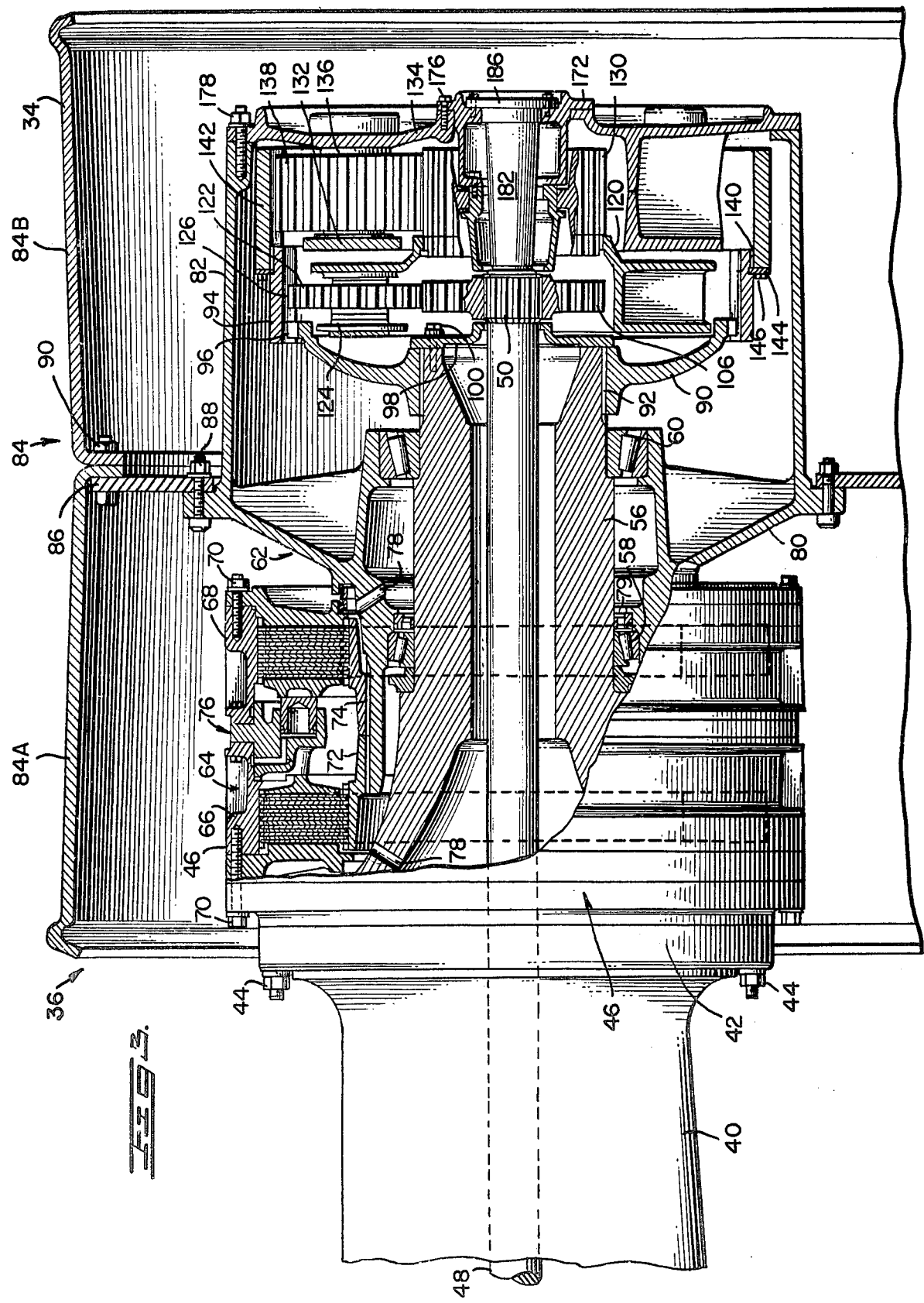

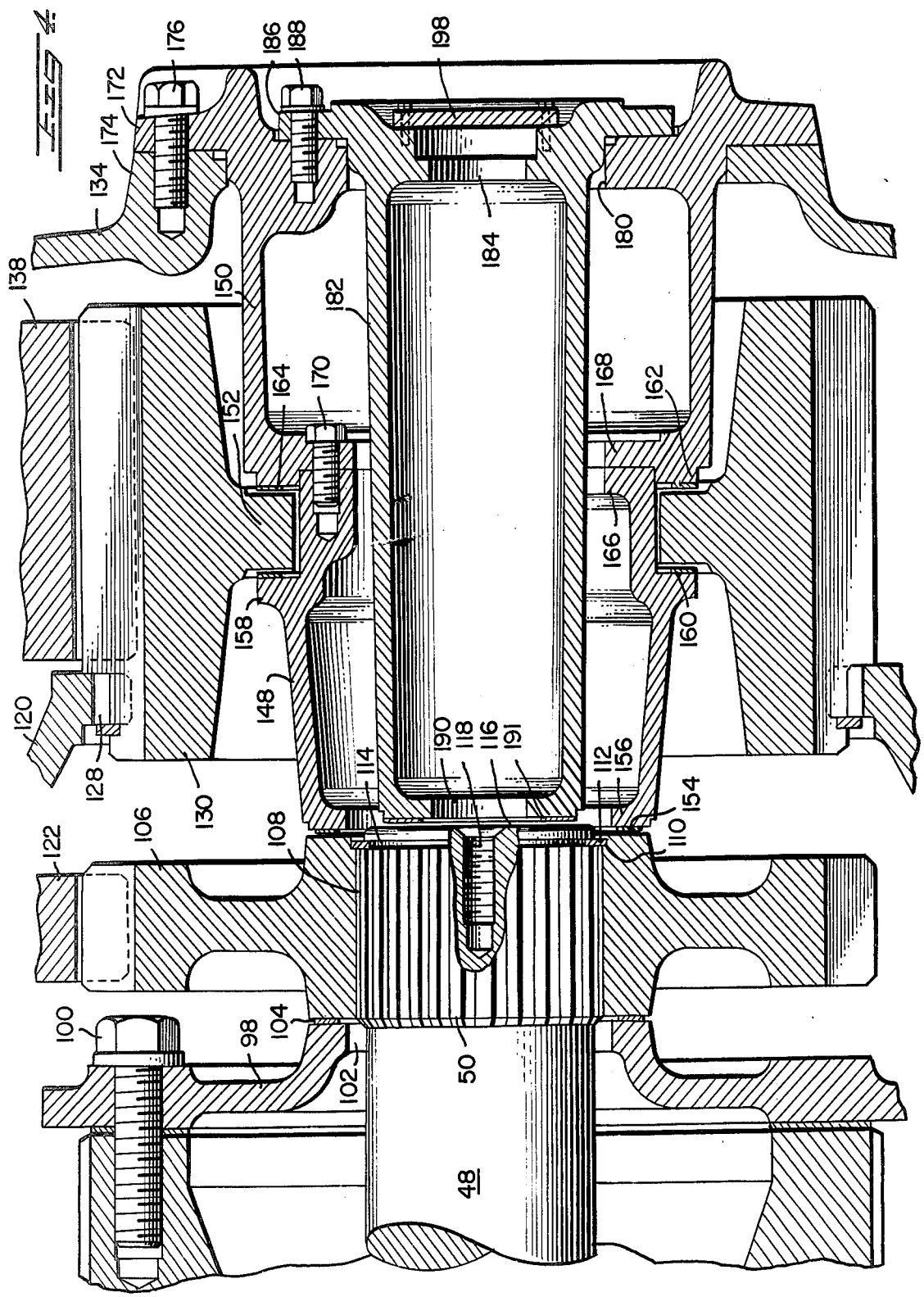

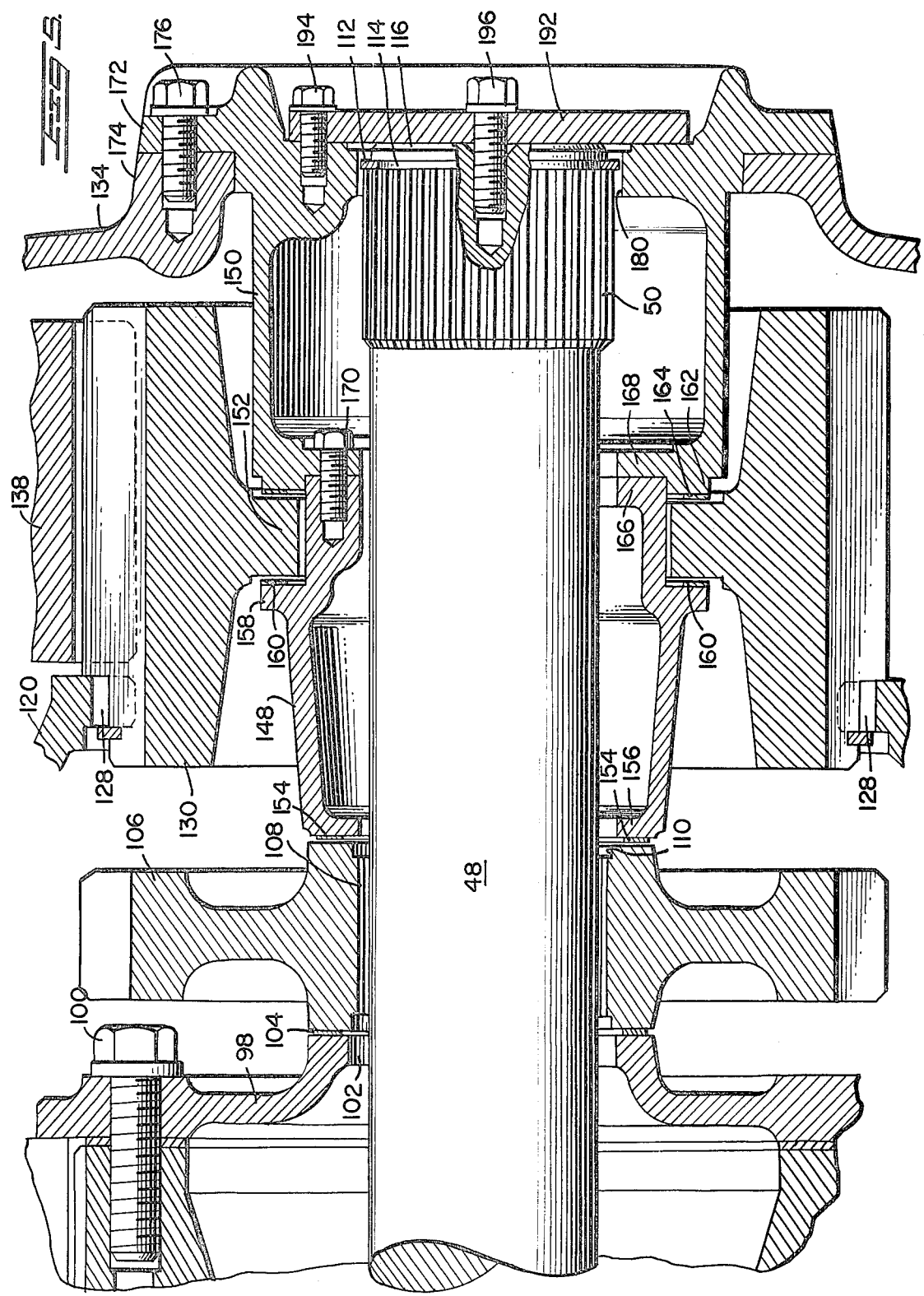

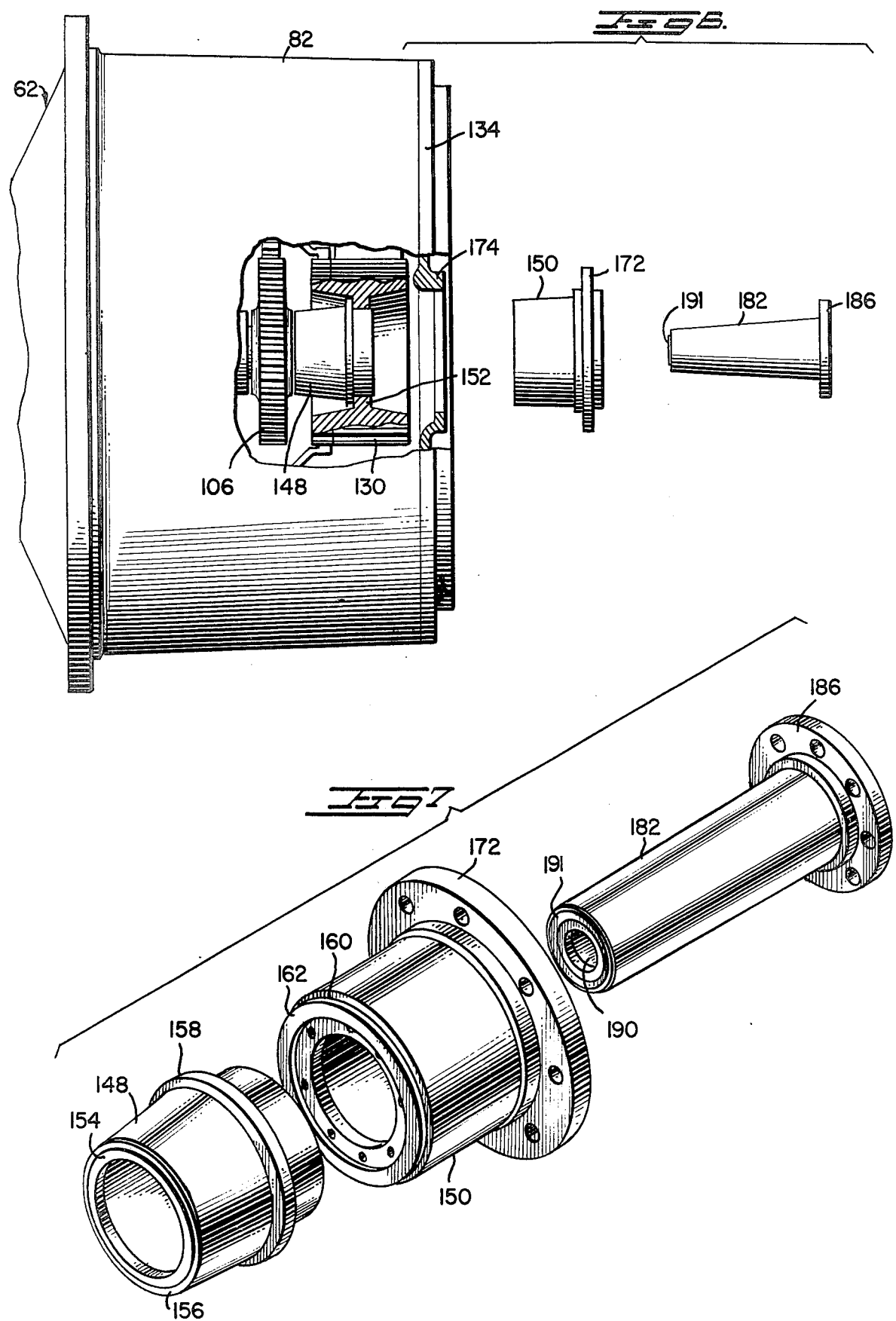

WHEEL FINAL DRIVE ASSEMBLY

BACKGROUND OF THE INVENTION

The present invention relates generally to wheeled vehicles, in the nature of heavy duty apparatus used for construction, earth working, earth moving and the like.

More specifically the invention relates to a final drive assembly for such vehicles which includes a double planetary gear system, and means are incorporated in the overall final drive assembly to position components utilized therein and of a nature permitting deactivation or disconnection of the drive system gearing, and a drive axle shaft, from the power drive train of the vehicle. This permits stowage of, or removal of the drive shaft axle, whereby the vehicle can be more easily moved or towed without the overall drive mechanism rotating.

In vehicles of the type to which the present invention is applied, wheel final drive assemblies have heretofore utilized a two stage or double reduction planetary mechanism positioned within a wheel hub, and connected to the vehicle drive wheels. Such structures have however been difficult to maintain and service, and difficulties were encountered in movement of the vehicle from one location to another by towing, for example, since the entire power drive train subsequent to the transmission was operatively interconnected, as regards the various components thereof, whereby substantial drag was involved as also possible parts damage.

A wheel drive mechanism of this type, consisting of a multiple planetary type, is disclosed in U.S. Pat. No. 3,452,612, dated July 1, 1969 and entitled WHEEL DRIVE MECHANISM and owned by the assignor of this application.

The wheel drive mechanism disclosed in that patent, and other known similar drive mechanisms, however, inherently had disadvantages resulting from factors including substantial bulk, size and weight, as well as difficulties in inspection and servicing of the mechanisms due to complex constructions. The sizes and weights increase possibilities of damage when, for example, towing the vehicle from one work location to another.

Other disadvantages prevalent in previously known and used wheel drive mechanisms of a double planetary reduction type included complexity of structure used to position and support the various sun and planet gearings in the overall drive assembly structure, and such assemblies were therefore difficult to disassemble or to deactivate for servicing or towing a machine on which utilized.

As is known, sun gears and other mechanisms in a two stage or double planetary must be properly located and positioned, one with respect to another, and this necessitates appropriate thrust means, for example, for the appropriate locating or positioning of the sun gears.

While drive assemblies such as in the patent above mentioned, and others, have permitted removal of a drive axle shaft, the mechanism involved has been of such a degree of complexity, weight etc. as to be difficult and time consuming in use and some structures necessitated a complete disassembly of the final drive.

Additionally, in heretofore known structures the positioning and/or locating means for the various gears has been not only complex, but involved numerous mechanisms and parts.

It is accordingly a primary object of the present invention to eliminate, in so far as possible, drawbacks existant in the prior apparatus.

Another and important object of the present invention is to provide a final drive assembly in the nature of a double planetary gear system wherein means to position the various components are of such construction and association in the gear system as to enhance assembly, disassembly, inspection and/or service while at the same time facilitating retraction and stowing or removal of a drive axle shaft without disassembly of the final drive.

DESCRIPTION OF THE PRIOR ART

Heretofore, as above pointed out, drive systems in wheeled vehicles of substantial size and of heavy duty construction have utilized two stage or double planetary final drive gearing systems, but the constructions have in many instances been such as to prevent difficulties in assembly, disassembly, inspection and maintenance.

In some known prior constructions when it was desired to move a vehicle from one location to another, and preferably with the drive train deactivated, for which purpose retraction or removal of the drive axle shaft was desired, the final drive assembly was of a structure and design necessitating substantially total disassembly prior to retraction or removal of the axle shaft.

Such prior known final drive assemblies also frequently involved complexities in positioning and locating the various gears and other members constituting the overall final drive assembly.

SUMMARY OF THE INVENTION

The present invention is directed to a new and novel wheel drive asesembly for heavy duty vehicles of a two stage or double planetary reduction system, overcoming drawbacks and undesirable features of previous constructions, while at the same time providing a structure of substantial simplicity. In essence the mechanism for positioning of the gears, and primarily a sun gear of the second planetary gear system, involves three basic movable parts, including a two part, separable component, hollow removable plug or carrier member, and an outer plug inserted through the hollow member operatively locating an axle drive shaft in the assembly. Subsequent to removal of the outer plug a tool is insertable through the hollow plug and engagable with the axle drive shaft to withdraw it from active association with a vehicle drive system.

Another feature of the invention is to incorporate a multiple part selectively removable hollow plug assembly which is, together with the overall gear system, located within the wheel hub, and with the various plug components being easily and readily manipulated from the exterior of the wheel hub.

An additional feature of the invention is to facilitate access to the drive connection to a wheel of a four wheel vehicle, for example, each wheel being driven operatively from the overall drive train of the vehicle, the overall assembly being readily accessible for inspection, repair, and deactivation by displacement of the drive axle shaft to a stowed position, or removal thereof.

The invention accordingly is principally directed to a wheel final drive assembly for vehicles wherein the assembly includes a two stage or double reduction planetary gearing mechanism, positioned within wheel hubs connected to the vehicle drive wheels, and which further includes a drive axle shaft for interconnecting a vehicle power train differential and the gearing mechanism. A separable two part hollow hub has positioning faces or surfaces for contacting and axially positioning gears of the mechanism. A hollow spacer plug is insertable through the hollow hub, and has a face contactable with the outer end of the axle shaft to operatively position the axle shaft. Removal of the spacer plug from the hollow hub permits movement of the axle shaft through the hollow hub to an inoperative position in the assembly, and permits a partial stowing of the shaft within the assembly, or complete removal therefrom, to safely and easily implement towing or movement of the vehicle, with the wheel drive assembly being operatively disconnected from the main power train of the vehicle.

Three simple components, i.e., in essence, the two hollow hub portions and spacer plug provide the sought end result. The apertured or hollow hub portions constitute gear positioning members, and the spacer plug, having a thrust face or surface, contacts and positions the axle shaft and prevents outward movement thereof. The hollow split carrier or separable part hub permits insertion of the plug therethrough for axle shaft positioning and the split carrier additionally serves to axially position a primary sun gear and a secondary sun gear in the final drive gear assembly.

Additional objects, features and advantages of the invention will be more readily apparent from the following detailed description of an embodiment thereof when taken together with the accompanying drawings in which:

FIG. 3 is an enlarged fragmentary view, with parts broken away, and partially in section, of the wheel final drive assembly and system, and associated components;

FIG. 4 is an enlarged fragmentary sectional view of a portion of the wheel drive assembly, components being shown in an operative driving condition;

FIG. 5 is a view similar to FIG. 4, but showing the components in a deactivated relation, the drive axle shaft being disconnected from the power train, with the shaft being in a stowed condition to facilitate towing of the vehicle;

FIG. 6 is an exploded view showing components of the gear and axle positioning means of the wheel drive assembly with a spacer plug and one hollow hub part removed to provide access to the final drive; and FIG. 7 is an exploded perspective view showing on an enlarged scale the gear and axle positioning components.

DETAILED DESCRIPTION

Figure 1:
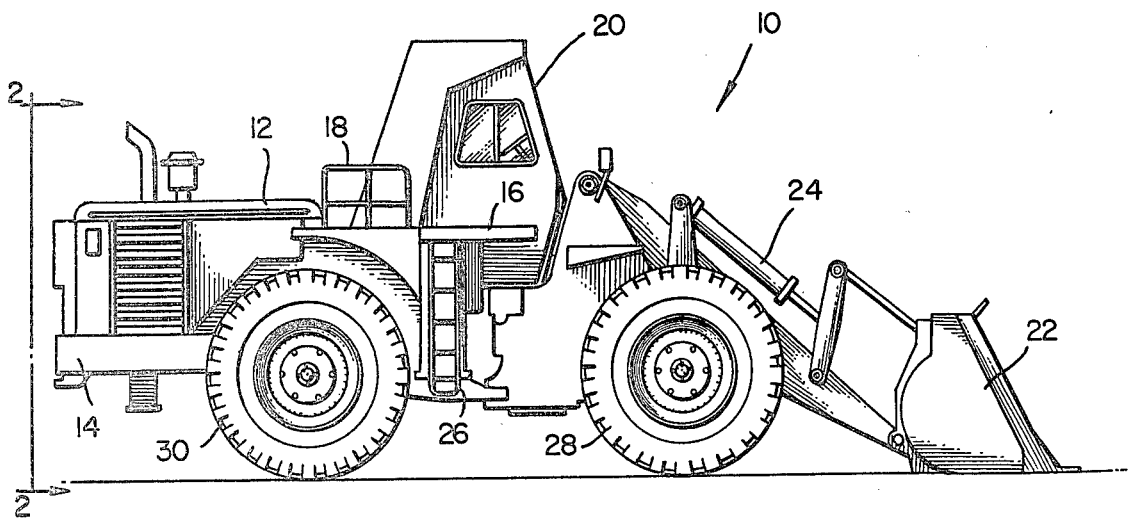
FIG. 1 is a side elevational view of a wheeled vehicle, more particularly a front end loader of a type and size with which the present wheel drive assembly is associated.

Referring now in detail to the drawings, there is shown in FIG. 1, and generally designated 10, a wheeled front end loader which includes an engine compartment assembly 12, a bumper 14, an operator's platform 16 having a guard rail 18, an operator's cab 20, a bucket of a general type 22 operable through hydraulic piston and cylinder means generally shown at 24, and an access ladder 26 to the operator's platform. The vehicle is equipped with wheel and tire units or assemblies 28 and 30. The vehicle is of a structure manufactured by the assignee of this application.

Wheel loaders manufactured by the assignee company, of a type to which the present invention is applicable, are generally discussed herein as a background for the present invention, and to show desirability of the present structure. The vehicles are of substantial size and weight, and the dimensions and specifications play a substantial part in the design of the invention, with provision being made for operator or worker access to various parts of the unit, for inspection, servicing, repair and the like.

Figure 2:
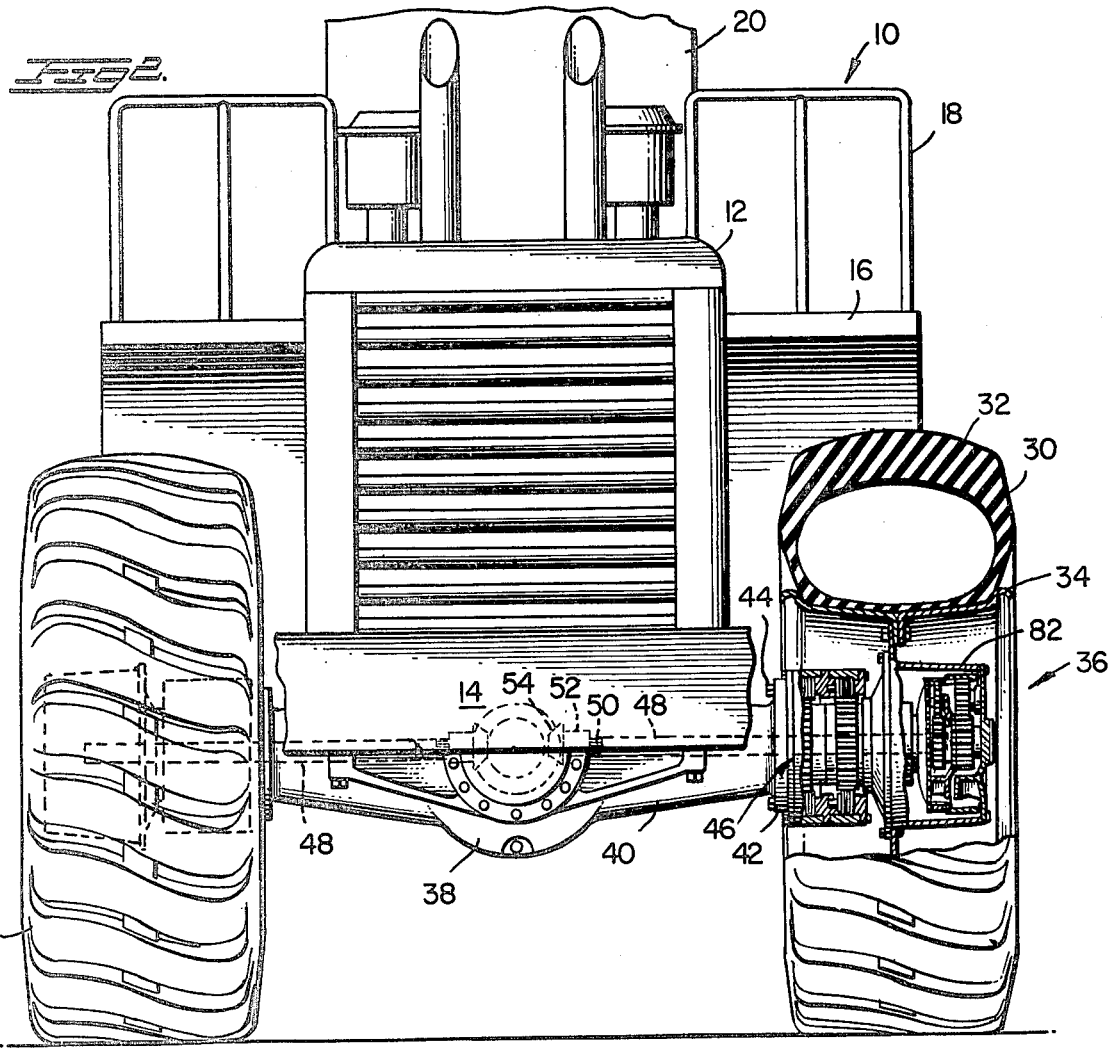
FIG. 2 is a fragmentary enlarged rear elevational view, with portions broken away and in section for clarity and disclosure, and with portions in broken lines to disclose structural association.

Referring to FIG. 2 of the drawings, each of the wheel assemblies, only one of which will be described in detail, includes tire 32 mounted on a split rim 34, the wheel being generally designated 36. Each of these wheels, four in a four wheel drive unit, or at least two, in types of vehicles with which the invention is associated, will generally be separately driven from a power train through a differential, the housing of which is designated 38, and from which extends a hollow differential axle housing 40 terminating in end flanges 42 bolted at 44 to a wheel brake hub 46.

Axle drive shafts 48, shown in dotted lines, extend through the housing 40 to each wheel drive assembly, as will be described hereinafter, and each axle drive shaft 48 at its inner end is joined telescopically with a hub of a side gear of the differential, also shown in broken lines. The axle drive shaft 48 has a splined shaft end 50, which is slidably engaged with internal splining of side gear hub 52, the hub being a portion of side gear 54 of the differential. The mating lengths of these two splined areas are of significance as will appear hereinafter.

An axle shaft support and housing member 56 is operatively secured to the hub, and has a central opening through which the axle shaft 48 extends. This support or housing 56 is stationarily affixed to the hub, and by means of tapered bearing assemblies 58 and 60 rotatably mounts a rotatable hub 62.

A disc brake assembly 64, partially shown, includes a plurality of brake discs arranged in sets in a back to back arrangement, stationary discs being attached to stators 66, 68 by splining, and stators to brake hub portions by bolts 70, and other coacting discs being operatively attached to support members or rotors 72 splined to rotatable hub member 62 at 74. A brake operating member in the nature of an operating ring, generally indicated at 76, has means operable to selectively actuate the sets of the back to back disc brake assembly dependent upon the actuation of the brake implementing means, a first braking increment initially energizing one set and, as required, the second set for greater brake force is initiated. This brake structure is only schematically shown herein since not constituting a part of the herein claimed invention. The showing is merely to incorporate in a general way the structure involved, as associated with the final drive assembly. The specifics of the double back to back disc pack brake invention are disclosed and claimed in detail in my copending patent application entitled Double Disc Type Brake System, Ser. No. 879,306 filed Feb. 21, 1978. In the disclosed structure as broadly shown, ports or passageways 78 are provided, for return of cooling oil from the brake assembly. Cooling oil pump means, shown generally at 79, and being a pump ring, provided to force oil under pressure to the brake sets.

The rotatable hub member 62 includes a disc like flanged portion 80, and an annulus or annular portion 82. A split wheel rim 84 includes portions or segments 84A, 84B. A mounting ring 86 is attached to the outer periphery of the disc like flange portion 80 of the rotatable hub member 62 by bolts and nuts 88. The rim segments 84A, 84B are joined together and connected to the mounting ring 86 by bolts and nuts at 90.

The annular hub portion 82 has mounted therewithin the final drive assembly of the present invention, as shown for example in FIG. 3. A bell shaped gear support member 90 is mounted on the outer end of the axle shaft housing 56 and connected thereto by a spline at 92. An internal ring gear 94 is mounted on the outer periphery of the gear support member 90 by means of interconnecting splined or toothed segments generally indicated at 96. A clamp or retainer plate 98 is attached to the outer end of the shaft support housing 56 by bolts 100. This retainer plate 98 has a central opening or aperture through which axle shaft 48 extends, and which is in spaced relationship therewith. Externally of, and surrounding the central aperture 102, and affixed thereto, is means constituting a thrust face or surface 104, FIG. 4, in the nature of a thrust washer, or other similar construction consisting of a hardened thrust surface, bonded to the plate surface.

A primary sun gear 106 having a splined bore therein 108, see FIG. 5, is mountable on splined shaft end 50 when the final drive gear assembly is operatively connected as will be described hereinafter. The thrust face or bearing 104 serves, through contact, as a thrust bearing to positionally control the innermost position of primary sun gear 106, as shown in FIG. 4. This thrust face 104 serves the usual function of a hardened surface thrust bearing between a stationary and rotating member, i.e., retainer plate 98 and primary sun gear 106, the latter being operatively rotated by means of the shaft 48 which is connected to the drive train of the vehicle at its inner end. A groove or recess 110 is provided in the hub or primary sun gear 106 in which a retainer ring 112 is positioned, and the outer end of the axle shaft 48 has a groove 114 spaced inwardly from the outer facial end 116 of the shaft, the ring 112 being additionally inserted therein. This retainer ring, with positionment in the two grooves 110 and 114, governs the inward position of axle shaft 48, and therefore the relative position of the inner end which is splinedly engaged in the side gear hub. The facial end 116 also plays a part in the inner positionment of axle shaft 48, as will appear hereinafter. This end of shaft 48 has a threaded bore 118 therein which serves as means for facilitating withdrawal of the axle shaft 48 to an inoperative position, as also will appear hereinafter.

The primary sun gear 106 is one of the gears in the double planetary gear system. A primary planet gear carrier 120 mounts a plurality of planet gears 122 rotatably thereon by means of stub shafts 124. These planet gears are in operative engagement with primary sun gear 106 in a usual manner. The outer peripheries of the planet gears, as shown at 126, are also in operative engagement with the teeth in internal ring gear 94. The primary planet gear carrier 120 is provided with toothing, constituting an internal ring gear 128, which is in splined connection with secondary sun gear 130, the latter being rotatable by the primary planet gear carrier, which rotates through planet gears 126 operatively engaging with the teeth of internal ring gear 94, and all being driven from primary sun gear 106.

A ring portion 132 of hub plate 134 is fixed for rotation with the annular hub portion 82. The hub plate 134 in effect constitutes a second stage planetary carrier and by means of stub shafts 136 mounts secondary planet gears 138. These secondary planet gears at their inner peripheries are in operative engagement with the teeth of secondary sun gear 130. The inner ring gear 94 has a step 140 in its outer external surface. A second or second stage internally toothed ring gear 142 is fixedly positioned by means of a ring 144 coacting with step 140, and attached to the ring gear at 146. The teeth on secondary planet gears 138 are operatively interengaged with the internal teeth of internal ring gear 142 and partially serve as a support therefor.

The locating and positioning means for the various gears in the gearing system include a two part, or two piece, separable part hollow hub, the inner hollow hub piece being indicated at 148, see FIG. 4, and an outer hollow hub part 150 which is attachable thereto.

The secondary sun gear 130 has an apertured inner central web 152. The inner end of inner hub part 148 has a thrust face or surface 154 thereon which is in the nature of a hardened thrust bearing, and which is mounted on an extended flange or raised ring surface 156, the thrust face being operatively engagable with the exterior of the hub of primary sun gear 106. The hub part 148 is additionally provided with a flange 158 which at its rear mounts a thrust surface or face 160. The outer hollow hub part 150 has a ring shaped extended nose portion 162 which mounts a thrust bearing or surface 164. Inner flanges 166 and 168 are provided on inner and outer hollow hub parts 148 and 150 respectively. Bolts 170 are operatively interengaged in bores provided in these inner flanges, and serves to secure the two hub parts one to another. The configuration of the outer end of hub part 148, and the inner end of hub part 150, form therebetween an annular recess within which the central web 152 of secondary sun gear 130 is positioned. The inner extremity of the web is spacedly positioned from the bottom of this annular recess, and the two thrust surfaces 160 and 164 engage the external axial faces of the web 152 as assembled in the gear system.

The outer end of outer hollow hub part 150 is provided with an external flange 172 which engages with and is connected to a flange or central ring portion 174 on hub plate 134 by bolts 176.

The outer periphery of hub plate 134 is attached to the outer axial periphery of the annular hub part 82 by bolts 178. Thus as hub portion 82, with the rotatable hub, rotate through the gearing mechanism, the wheel rim 84 will rotate therewith.

A central opening 180, as also the other openings provided in the hollow hub members, permits insertion therethrough of a spacer plug or the like 182, which at its outer end has a central opening 184 and a flange 186, through which bolts 188 operatively extend for securement of plug 82 on outer hub member 150. A central opening 190 is provided on the inner end of plug spacer 182, and on an extended nose portion thereof mounts a thrust face or bearing surface 191. In the position shown in FIG. 4 of the drawings, the spacer plug 182 has the bearing face or surface 191 thereon engaged with the facial end 116 of shaft 48 to thereby position the shaft in, and with respect to, the gearing and the main differential.

When these members are in the position shown in FIG. 4 rotation of shaft 48 through the differential 38 will rotate primary sun gear 106, which in turn rotates primary planet gears 122, which in engagement with the teeth of internal ring gear 94 orbit or rotate the primary planet gear carrier 120. This movement of the planet carrier in turn rotates the secondary sun gear 130, which in engagement with the secondary planet gears 138 will cause rotation of hub plate 134, and together therewith the rotatable hub to thereby impart rotational drive to the wheels of the vehicle. Preferably this drive is imparted to each of the wheels of the vehicle, although only one has been shown and described in detail. It is to be noted that the various bearing surfaces or faces carried or bonded on, respectively, the inner plug portion 148, outer plug portion 150, and extended nose portion of spacer plug 182, all serve to position the various gears and axle shaft when in the operative disposition shown in FIG. 4. The thrust surfaces are shown spaced from a contacting surface in some instances for clarity.

When it is desired to inactivate or disconnect the vehicle drive train from the final drive assembly, and therefore the driving wheels, the following takes place. A rod like member, not shown, can be inserted through the central openings in the two ends of the spacer plug, and the rod has a threaded inner end which is adapted for threaded engagement in the threaded bore 118. This interconnection is for the ultimate purpose of withdrawing the axle shaft 48 from engagement at its inner end with the sleeve in the side gear hub, and at the same time outwardly move the splined end of the shaft from the splined bore 108 in the primary sun gear 106. A support bearing, not shown, can be provided for the inner disconnected end of the shaft adjacent the differential. Before the axle can be so withdrawn however it is necessary that the spacer plug be disengaged from the outer hub part 150 and withdrawn from the hollow interiors of the two plug parts. This then permits the toothed end of the axle shaft to be disengaged from the primary sun gear.

It desired the shaft can be completely removed, or can be disposed in a stowed position within and with respect to the wheel and gearing. This condition or position is shown in FIG. 5 wherein the axle shaft has been outwardly moved to a position of disengagement with respect to the primary sun gear 106, and the shaft end 50 disengaged and displaced from the internal splining or toothing in the sun gear 106. In this disconnected position a plate 192 is attached over the opening 180, and attached to the outer hub part by means of bolts 194. A central bolt 196 engages in the threaded bore 118 in the end of the axle shaft as seen. With the final drive thus operatively disconnected from the drive train of the vehicle, rotation of the drive wheels and movement of the vehicle can be effected without rotation or movement of the final drive assembly. This facilitates movement of the vehicles which are of substantial size and weight, and also diminishes the possibilities of damage to the drive gearing system.

It is to be noted, and is of substantial importance, that this deactivation can be effected simply by removing the spacer plug 182, and withdrawing the axle shaft 148 by means of the threaded end rod which can be inserted guidedly through the openings in the spacer plug, or subsequent to removal thereof. All other elements in the final drive assembly are positionally maintained and supported, even subsequent to movement of the axle to a stowed or removed position.

The structure as shown and described additionally has a feature of significance in that the outer hub part or portion 150 can be disconnected from the inner hub part or portion 138 by removal of bolts 170. Thereafter, subsequent to removal of bolts 176 the so disconnected outer hub portion 150 can be removed. This creates a substantial opening in the hub of the wheel and permits ready inspection of the inner gears etc. of the final drive assembly in a facile and easy manner. A dust cover 198 can be provided for closing the outer opening of the spacer plug 182, to prevent dust or dirt from penetrating into the gear train.

By reference to FIGS. 6 and 7, the components for locating and positioning, and supporting the various members constituting the final drive assembly are be seen in a disassembled and exploded relationship one from the other.

It will thus be seen that the wheel drive assembly is of such structure and function that the wheel drive can be easily and readily deactivated by disconnection from the system drive train with axial movement of the drive shaft, and all by virtue of the multiple part hollow hub construction, in an easy manner. Means are also provided for stowing the axle in a drive disconnected or inoperative position. The location and positioning, as also the support of the various gearings and gears and associated mechanism in the two stage final drive, are provided by the separable parts and the spacer plug, the positioning being accomplished by the thrust surfaces or bearing faces as heretofore described.

Functionally the separable, multi-part, hollow hub structure and spacer plug serve not only as carriers for thrust means to operatively engage and position elements in the final drive assembly, but additionally permit a substantial opening to be provided through the secondary sun gear to receive the spacer plug for positioning the drive axle. Removal of the spacer plug provides a substantial access opening for manipulation of the drive axle to a stowed or removed position; provides access and space for disconnection of the outer hollow hub part from the inner part; and thereafter removal of this outer part. Removal of the outer hub part results in a substantial opening for inspection within the housing. These functions are all possible without the necessity of disassembly the final gearing assembly.

Manifestly minor changes in details of structure can be effected without departing from the spirit and scope of the invention as defined in, and limited solely by, the appended claims.

What is claimed is:

1. A wheel final drive assembly for vehicles, wherein the assembly includes a double reduction planetary gearing mechanism positioned within and drivingly connected to a wheel hub of a vehicle drive wheel, a drive axle shaft interconnecting a vehicle power train differential and the gearing mechanism, a separable part hollow hub having positioning faces contacting and axially positioning gears of the gearing mechanism, a hollow spacer plug removably insertable through the hollow hub and having a face contactable with the outer end of the axle shaft to operatively position the axle shaft in driving connection between said differential and gearing mechanism, removal of the spacer plug permitting selective movement of the axle shaft through the hollow hub to an inoperative position in the assembly for partial stowing therewithin, and for complete removal therefrom.

2. A wheel final drive assembly for vehicles comprising a reduction gearing mechanism mounted within and operatively connected to a wheel hub, a drive axle operatively interconnecting a vehicle power train and said gearing mechanism for driving the wheel, said gearing mechanism including a plurality of gears operatively interconnected in a gear train, a separable multi-part hollow hub mounted within a portion of said gear train, said hub parts operatively contacting some said gears and thereby axially positioning said gears in said gear train, a member insertable through said hollow hub for contacting an end of said drive axle to axially operatively position said drive axle in the mechanism, said member, upon removal, permitting axial movement of said drive axle to an inoperative position.

3. A wheel final drive assembly as claimed in claim 2, said parts of said hollow hub and said insertable member having thrust surfaces thereon operable for contacting the gears for positionment thereof.

4. A wheel final drive assembly as claimed in claim 3, said thrust faces consisting of a hardened metal and being bonded to the material of said hub part.

5. A wheel final drive assembly for vehicles as claimed in claim 4, wherein said member insertable through said hollow hub comprises a hollow spacer plug, and wherein a hardened material thrust surface is bonded on the contacting end of said member in the nature of a thrust washer.

6. A wheel final drive assembly as claimed in claim 5, wherein said hollow hub parts have raised areas extending from the front ends thereof, and said thrust surfaces being on said raised areas.

7. A wheel final drive assembly as claimed in claim 1, said positioning faces on said hollow hub parts consisting of hardened metal material, bonded to the material of the hub part, and being in the nature of thrust washers.

8. A wheel final drive assembly as claimed in claim 7, said face on said hollow spacer plug consisting of hardened metal material, bonded to the material of said spacer plug, and being in the nature of a thrust washer for contact with the outer end of said axle shaft.

9. A wheel final drive assembly as claimed in claim 1, the outer end of the outer one of said hollow hub parts having an open aperture, the outer end of said hollow spacer plug being detachably connected over said open aperture to permit removal of said plug from within said hollow hub parts, and thereby providing access through said hollow hub parts, having open ends, to the outer end of said axle shaft for movement thereof.

10. A wheel final drive assembly as claimed in claim 9, said hollow spacer plug having openings through the inner and outer ends thereof, said axle shaft having a threaded bore in the outer end thereof, said hollow spacer plug being adapted for insertion of a threaded end tool through the open ends thereof for mating engagement of the threaded end in the threaded bore in said axle shaft, subsequent withdrawal of the rod serving to withdraw therewith said axle shaft.

11. A wheel final drive assembly as claimed in claim 1, said double reduction planetary gearing mechanism including a first stage sun gear, said axle shaft having a splined outer end thereon, said first stage sun gear having an internally splined hub, the splining on said axle shaft end being matedly engaged in the splined hub of said first stage sun gear for imparting rotation from said vehicle power train differential to said gearing mechanism, a stationary hollow open ended drive axle shaft housing connected at its inner end to a stationary hub portion of the vehicle with said axle shaft being movably mounted therein, a centrally apertured clamp plate mounted to and over the open outer end of said axle housing with said axle shaft extending through said clamp plate aperture, said splined outer axle shaft end being positioned externally of said clamp plate and being operatively engaged in the splined hub of said first stage sun gear, said clamp plate having means defining a thrust face surrounding said clamp plate aperture, contactable with the axially inner hub face of said first stage sun gear and constituting through contact one with the other, an inward position locater for said primary sun gear.

12. A wheel final drive assembly as claimed in claim 11 said axle shaft at its inner end being in splined connection with a gear hub in said differential and upon withdrawal of said axle shaft serving to disconnect said inner end from said differential and thereby deactivating said wheel final drive assembly.

13. A wheel final drive assembly as claimed in claim 9 said axle shaft at its inner end being in splined connection with a gear hub in said differential and upon withdrawal of said axle shaft serving to disconnect said inner end from said differential and thereby deactivating said wheel final drive assembly.

14. A wheel final drive assembly as claimed in claim 12, wherein said gearing mechanism is positioned within a rotatable wheel hub, said rotatable hub having an open outer end, a centrally apertured hub plate attached to said rotatable hub over said open outer end, said gearing mechanism including a final out drive operatively connected to said hub plate for imparting rotation thereto, and therewith the rotatable hub, said separable part hollow hub having the outer part thereof extending through the aperture in said hub plate and externally detachably connected to said hub plate, said spacer plug being inserted through an open outer end of said hollow part, having its outer end removably attached to said outer hub part, and serving additionally to close the outer open end of said hollow plug part.

15. A wheel final drive assembly as claimed in claim 1, said gearing mechanism including first and second stage sun gears in axial alignment in, and constituting a part of, an operable gear train, said axle shaft having a splined connection with an internally splined hub of said first stage sun gear, said second stage sun gear having an apertured internal central web, said separable part hollow hub including an inner part and an outer part detachably connectable to one another at meeting ends thereof, said inner and outer parts having external flange constituting portions proximate the inner connected ends thereof, said flange portions being axially spaced and defining therebetween an annular recess, said apertured central web of said second stage sun gear being positioned in said annular recess, with the internal surface of the aperture being radially spaced from the bottom of said annular recess, the inner faces of each flange portion on said inner and outer hollow hub parts having thrust faces formed thereon, said thrust faces being contactable with the axial faces of said central web to position said second stage sun gear in said gear train.

16. A wheel final drive assembly as claimed in claim 10, a cover plate removably attachable over said open aperture on the outer end of the outer one of said hollow hub parts, and having an opening therethrough, and a bolt inserted through said plate opening and threadedly engaged in said threaded bore in the outer end of said axle shaft, and thereby supportedly mounting and securing the outer end of said axle shaft in a stowed partially removed position operatively disconnected from said gearing mechanism to facilitate towing of the vehicle.

17. A wheel final drive assembly as claimed in claim 14, said outer hub part, following detachment from said inner hub part, being removable from said wheel hub thereby providing a substantial access opening to the interior of the final drive for inspection and servicing thereof with only partial disassembly of the final drive.

18. A wheel final drive assembly as claimed in claim 16, said second stage sun gear being removable from said wheel hub subsequent to removal therefrom of said outer hollow hub part, and subsequently permitting removal of said inner separable hub part, the remaining gears in the gearing mechanism being easily accessible for inspection and servicing.

19. In a vehicle final drive assembly a double reduction planetary gear mechanism operatively interconnected to a vehicle power train drive means, a hollow separable part hub means mounting thrust faces and being movable to selectively engage said thrust faces with a second stage sun gear in the gear mechanism for operative positionment thereof with respect to planetary and other gears in the mechanism, an outer said hub part being removable from the assembly to provide access for inspection and servicing of said final drive mechanism.

20. In drive mechanism as claimed in claim 19, an axle shaft operatively connecting said final drive gear mechanism to said vehicle drive means, a hollow spacer plug having a thrust face thereon insertable through said hollow hub parts to contact a first stage sun gear in said planetary gear mechaism to operatively position said sun gear, said plug being removable and thereafter said axle shaft being axially movable from an inner operative drive position, interconnecting said drive means and a first stage sun gear in said planetary gear mechanism to an outer position operatively disconnected from said first stage sun gear, said final drive mechanism in the outer disconnected position of said axle shaft being rotatable in the absence of rotation of the vehicle drive means.

21. A deactivatable multiple stage final drive assembly for a vehicle, said assembly including a double reduction planetary gearing mechanism, having a drive axle operatively interconnectable in a vehicle power train for operatively driving a vehicle wheel, a centrally hollow separable multiple part hub, and a plug member removably inserted therein, said hub parts having thrust faces thereon and being operable by contact of said faces with first and second stage sun gears spacedly in said gearing mechanism to operationally position said sun gears and therethrough assembly planetary gears, removal of said plug member permitting access to said driving axle for selectively axially moving said driving axle from a final drive operational connecting position to a nonoperational stowed position, and additionally permitting complete removal thereof, with the gears of the assembly otherwise remaining positionally supported but operationally disconnected from the vehicle power train to permit ease of servicing of the mechanism and towing of a vehicle in the absence of rotating parts of the vehicle drive in the power train, ahead of the final drive.

22. A wheel final drive assembly for vehicles, the assembly including a gearing mechanism connected to the vehicle drive wheels, a drive axle shaft interconnecting a vehicle power train differential and the gearing mechanism, said gearing mechanism having a central axial opening therethrough, a hollow separable part hub inserted in said axial opening and having contact faces for contacting and axially positioning gears of the mechanism, a hollow spacer plug insertable through the hollow hub and having a face contactable with the outer end of the axle shaft to operatively position the axle shaft, removal of said plug permitting access to and movement of the axle shaft selectively at least partially through said hollow hub to an outer inoperative position in the assembly, for stowing therewithin, and for complete removal therefrom.

23. A double reduction planetary gear final drive mechanism having a drive axle shaft operatively interconnected at an inner end in a vehicle power drive train, the outer axle shaft end being operatively centrally engaged to a first stage sun gear, plural centrally interiorly open thrust surface carrier means movably insertable within a portion of said drive mechanism, a plug member having a thrust surface thereon and being removably insertable in and extending through said open interiors of said carrier means, said plug and said carrier means being operable to axially position first and second stage sun gears and said axle shaft in said drive mechanism, said plug and said carrier means, upon removal, providing access to the drive mechanism and the outer end of said axle shaft, said axle shaft being axially movable to a position of disengagement from said first stage sun gear thereby disconnecting said drive mechanism from said power train whereby said drive mechanism is in a free wheeling condition.

24. A wheel final drive assembly for vehicles as claimed in claim 11, said axle shaft having a groove therein between the axial end thereof and said splining, said splined bore in said sun gear having a groove, a snap ring operatively engaged in both said grooves and thereby defining inner positioning of said axle shaft.

* * * * *